(12) United States Patent
Omiya (10) Patent No.: US 11,169,754 B2
(45) Date of Patent: Nov. 9, 2021

(54) INFORMATION PROCESSING METHOD, INFORMATION PROCESSING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Hidehisa Omiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/103,039

(22) Filed: Nov. 24, 2020

(65) Prior Publication Data

US 2021/0157535 A1 May 27, 2021

(30) Foreign Application Priority Data

Nov. 27, 2019 (JP) .............................. JP2019-214126

(51) Int. Cl.
*G06F 3/12* (2006.01)
*G07G 1/00* (2006.01)
*G07G 1/12* (2006.01)

(52) U.S. Cl.
CPC .......... *G06F 3/1243* (2013.01); *G06F 3/1206* (2013.01); *G06F 3/1256* (2013.01); *G07G 1/0009* (2013.01); *G07G 1/12* (2013.01)

(58) Field of Classification Search
CPC .... G06F 3/1243; G06F 3/1206; G06F 3/1256; G07G 1/0009; G07G 5/00; G06K 9/00; G06Q 20/209
See application file for complete search history.

(56) References Cited

U.S. PATENT DOCUMENTS

2015/0242169 A1 8/2015 Ito et al.
2015/0379573 A1* 12/2015 Hiramatsu ......... G06Q 30/0259
705/14.57
2019/0163972 A1 5/2019 Omiya et al.

FOREIGN PATENT DOCUMENTS

JP 2015-158775 A 9/2015
JP 2019-096142 A 6/2019

\* cited by examiner

*Primary Examiner* — King Y Poon
*Assistant Examiner* — Michael Burleson
(74) *Attorney, Agent, or Firm* — Workman Nydegger (57) ABSTRACT

An information processing method includes: a generation step of generating, based on at least one of a position and an attribute of the text data that is an extraction target and is included in print information that can be printed by a receipt printer, a new extraction condition under which text data is extracted; and a test step of extracting text data by applying, to test print information, an extraction condition group including one or two or more preset extraction conditions set in advance as a condition under which the text data is extracted, and the new extraction condition.

16 Claims, 7 Drawing Sheets

```
Restaurant Sample Receipt                        ─ 100
1123 Thermal Drive City, CA 91604
(555) 123-1234

Check # 46593043                    08/29/2019
Server : Staff                        15:30:30
Table : 1/1                          Guests : 2
─────────────────────────────────────────────
1 Iced tea                                2.00
1 Side salad                              3.50
1 Open Food                               4.00
1 Pulled Pork Sandwich                   10.00
    1 SIDE : Potato Salad
─────────────────────────────────────────────
Sub-total                                19.50
Sales tax                                 1.95
TOTAL                                    21.45

Balance Due                              21.45
```

INFORMATION PROCESSING METHOD, INFORMATION PROCESSING APPARATUS, AND NON-TRANSITORY COMPUTER-READABLE STORAGE MEDIUM STORING PROGRAM

The present application is based on, and claims priority from JP Application Serial Number 2019-214126, filed Nov. 27, 2019, the disclosure of which is hereby incorporated by reference herein in its entirety.

BACKGROUND

1. Technical Field

The present disclosure relates to an information processing method, an information processing apparatus, and a non-transitory computer-readable storage medium storing a program.

2. Related Art

A technology in which a server receives receipt print data from a printer coupled to a point of sales (POS) terminal and interprets the receipt print data by using a script for receipt analysis has been known. For example, JP-A-2015-158775 discloses a technology in which receipt print data is transmitted to a server and analyzed in the server by a method corresponding to a layout.

However, when applying a plurality of analysis scripts to a piece of print data, it is not possible to add a new analysis script to be applied and then examine whether or not analysis can be appropriately performed by using a plurality of analysis scripts including the added analysis script, which is problematic.

SUMMARY

An object of the present disclosure is to add a new extraction condition to a plurality of extraction conditions for extracting predetermined text data from print information and examine whether or not a result intended by a user can be obtained by using an extraction condition group including the new extraction condition.

According to an aspect of the present disclosure, an information processing method of an information processing apparatus that extracts, from text data included in print information for printing a receipt, a pair of an item name and an item value corresponding to the item name, the information processing method including storing a first extraction script group including a plurality of extraction scripts each including an extraction condition under which the pair is extracted, generating, based on at least one of a position and an attribute of the text data included in the print information, a new extraction condition under which the pair is extracted, generating a second extraction script group by using the first extraction script group and the new extraction condition, and performing a test in which the second extraction script group that is generated is applied to test print information to extract the pair. As a result, it is possible to automatically examine (test) whether or not a result intended by a user can be obtained by using an extraction condition group including a new extraction condition.

In the information processing method, the information processing apparatus receives a plurality of pieces of print information, each of which is the print information for printing the receipt, by performing communication with a receipt printer, stores the plurality of pieces of print information that are received, searches for the print information to be applied to the second extraction script group among the print information that is stored, causes selection, by a user operation, of the print information as the test print information among the print information that is searched, and uses, as the test print information, the print information that is selected. As such, by using print information similar to that in a real situation, it is possible to perform a test for an extraction condition group including a new extraction condition under a condition close to a real situation.

One extraction script of the plurality of extraction scripts included in the first extraction script group is displayed, and when the one extraction script that is displayed is edited by a user operation, the second extraction script group including the one extraction script that is edited is generated. Therefore, in addition to a case of adding a new extraction condition, when at least one preset extraction condition included in an extraction condition group is edited, it is possible to automatically examine whether or not a result intended by the user can be obtained by using the extraction condition group including the edited extraction condition.

One of the plurality of the extraction scripts included in the first extraction script group is displayed, and when an instruction to delete the one extraction script that is displayed is provided by a user operation, the second extraction script group from which the one extraction script is deleted is generated. Therefore, when at least one preset extraction condition included in an extraction condition group is deleted, it is possible to automatically examine whether or not a result intended by the user can be obtained by using the extraction condition group after the deletion.

The information processing method further includes a notification step of, when the test is performed, in a case in which the pair that is set in advance is extracted, making completion notification. As a result, it is possible for a user to automatically check whether or not a result intended by the user can be obtained by using an extraction condition group.

DESCRIPTION OF EXEMPLARY EMBODIMENTS

Here, embodiments of the present disclosure will be described in the following order: 1) Configuration of Information Processing Apparatus 1; 2) Information Processing; and 3) Other Embodiments.

1) Configuration of Information Processing Apparatus 1

Figure 1:
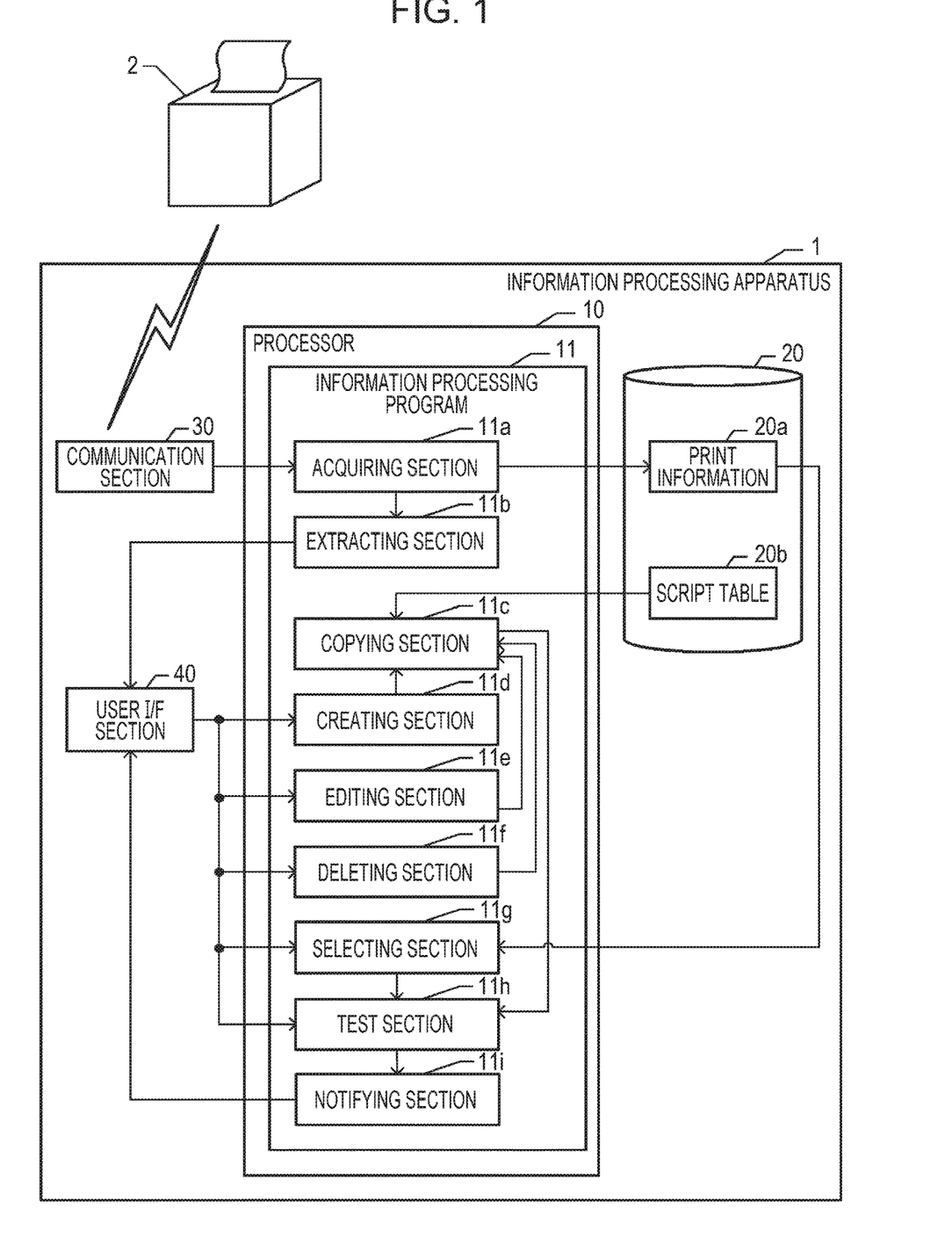
FIG. 1 is an overall configuration diagram of an information processing apparatus.

FIG. 1 is a block diagram illustrating an information processing apparatus 1 according to an embodiment. The information processing apparatus 1 according to the present embodiment is a server that can perform communication with a receipt printer 2 and that can perform communication with the receipt printer 2 via a network such as the Internet.

The receipt printer 2 is a printer included in a cash register of a store. That is, the receipt printer 2 is used to provide, to each customer who purchased a product in the store, printed material (receipt) indicating a purchase record, and the receipt is printed in response to an operation performed by an operator after payment. Naturally, the receipt printer 2 may be configured to cooperate with another device or may constitute a part of, for example, a point of sales (POS) system.

The receipt printer 2 can print various printed material according to an instruction from a control apparatus such as a cash register (not illustrated). That is, by using a function of a processor (not illustrated), the control apparatus can generate print information 20a indicating a purchase record indicating a price and the like of a product purchased by a customer. When the control apparatus outputs a control signal to the receipt printer 2 to instruct the receipt printer 2 to perform printing based on the print information 20a, the receipt printer 2 can print a printed material (receipt) indicating the purchase record. Note that the print information 20a transferred to the receipt printer 2 includes text data indicating text to be printed on the printed material and a command indicating a print position or attribute of each piece of text data.

The receipt printer 2 includes a transmitting section that can transmit the print information 20a to the information processing apparatus 1. When an instruction to print the printed material is issued, the receipt printer 2 performs printing by using a print head (printing section) of the receipt printer 2 based on the print information 20a and transmits the print information 20a to the information processing apparatus 1 by using a function of the transmitting section. The receipt printer 2 and the information processing apparatus 1 can perform communication with each other in a wired or wireless manner, and the print information 20a is transmitted from the receipt printer 2 to the information processing apparatus 1. Note that, as another example, the print information 20a may be transmitted from the control apparatus that controls the receipt printer 2 to the information processing apparatus 1. In this case, it can be regarded that the control apparatus that controls the receipt printer 2 also forms a part of the receipt printer 2. Note that the transmitting section includes a communication interface, a communication circuit, a communication port, and the like. Further, the transmission of the print information 20a performed by the transmitting section may be transmission using wired communication such as Universal Serial Bus (USB) or Ethernet, or transmission using wireless communication such as Wireless Fidelity (Wi-Fi) or Bluetooth (Ethernet, Wi-Fi, and Bluetooth are registered trademarks).

The information processing apparatus 1 includes a processor 10, a hard disk drive (HDD) 20, a communication section 30, and a user I/F section 40. The processor 10 controls the entire information processing apparatus 1. The communication section 30 is a unit that performs communication with an external device via the Internet or the like and can transmit and receive information through communication with the receipt printer 2. Note that the communication section 30 may have the same hardware configuration as the transmitting section of the receipt printer 2 and may perform wired communication or wireless communication, similarly to the transmitting section. The user I/F section 40 includes a display section that displays an image and an input section that receives an instruction input by a user. Further, as another example, the user may input instructions or perform display by using a client terminal that can perform communication with the information processing apparatus 1.

Figure 2:
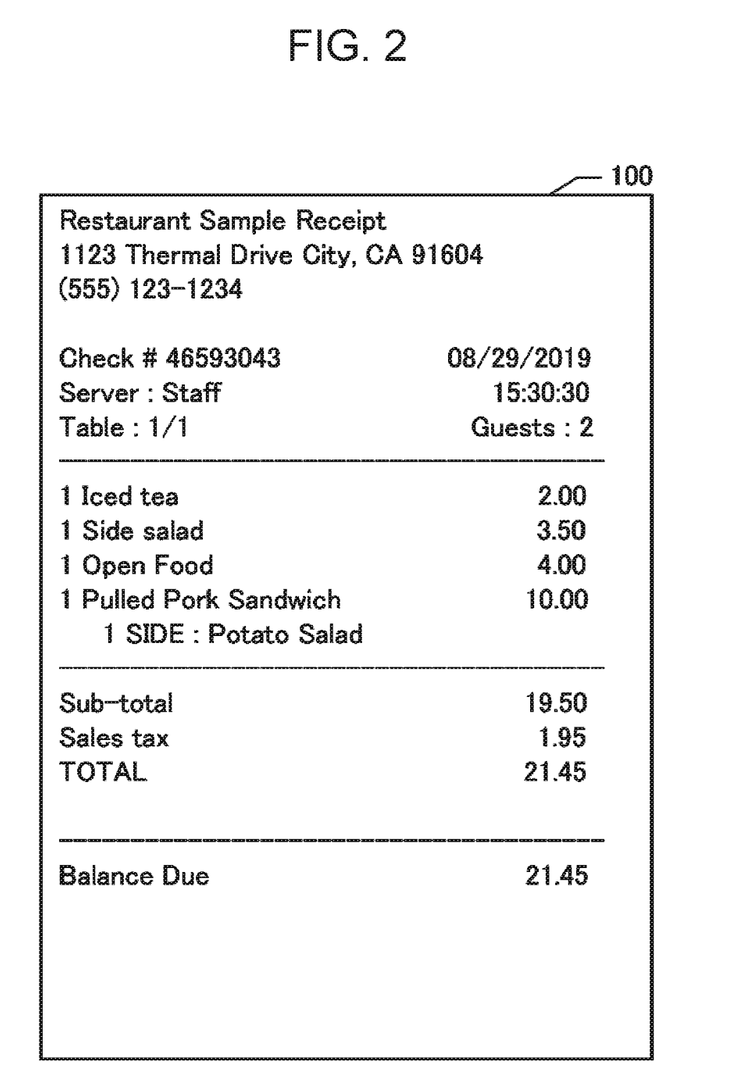
FIG. 2 is a view illustrating a receipt.

The HDD 20 stores various information and various programs. The HDD 20 stores a plurality of pieces of print information 20a and a script table 20b. The print information 20a is information received from the receipt printer 2 via the communication section 30, for example, information for printing a receipt 100 as illustrated in FIG. 2. The print information 20a is information corresponding to an actual printed receipt. The script table 20b stores, in association with each other, an extraction script group executed by the information processing apparatus 1 and a printer ID that identifies the receipt printer 2 that is a transmission source of print information 20a to which the extraction script group is to be applied. Here, the extraction script group includes a plurality of extraction scripts to be applied to a piece of print information 20a.

The extraction script is a program that describes processing of extracting specific information from text data included in the print information 20a and associating a specific item name included in the text data and information (item value) corresponding to the item name with each other. Examples of the item name can include a date, a total amount, and a product name of a purchased product. When the item name is a date, the item value is a numerical value indicating a date, and when the item name is a product name, the item value is a character string indicating a product name. The extraction script is a program for performing processing of extracting one or a plurality of pairs of an item name and an item value that correspond to each other. For example, the extraction script extracts an item name such as a date, a total amount, or a product name, and an item value corresponding to the item name from the receipt 100 which is the printed material illustrated in FIG. 2. The extraction script is a program that extracts one or a plurality of pairs of an item name and an item value by repeatedly performing the processing of extracting an item name and an item value and creates a structured document that assigns a meaning to each item value by associating extracted item names and extracted item values with each other in a corresponding manner.

In addition, an extraction condition that is referred to during extraction is defined by the extraction script. The extraction condition is a condition based on at least one of a position and an attribute, under which an item name represented by text data, and an item value represented by a numeric value, text data, or the like are extracted. Here, the attribute is a font size, a font type, or the like. Regarding the extraction condition based on the attribute, text data that corresponds to a character string, a font size, or a font type defined as the attribute is searched for as an item name, and an item value that matches the attribute in the same manner is searched for. Regarding the extraction condition based on the position, for example, text data on the left side is extracted as an item name and a numerical value on the right side is extracted as an item value at a predetermined position in a vertical direction of receipt data. The extraction condition may be a condition based on both the attribute and the position, under which the extraction is performed. As such, the extraction condition is included in the extraction script. Further, the extraction script group includes an extraction condition group including each extraction condition.

Note that the extraction script is defined as a file delimited by a start code and an end code, and a script recorded as a different file is regarded as a different script. In other words, the extraction script group includes a plurality of files as extraction scripts.

Although FIG. 1 illustrates only one receipt printer 2 for convenience of explanation, the information processing apparatus 1 manages a plurality of receipt printers 2. The extraction script group is prepared for each receipt printer 2, and the information processing apparatus 1 applies an extraction script group associated with the receipt printer 2 to print information transmitted from each receipt printer 2. As another example, the extraction script group is prepared on a per store basis, and the information processing apparatus 1 may apply an extraction script group associated with a store in which the receipt printer 2 is installed to print information transmitted from the receipt printer 2 installed in each store. As such, a unit of print information 20a to which the same extraction script group is applied can be arbitrarily set.

These extraction script groups are stored in the script table 20b in association with printer IDs of the receipt printers 2 to which the respective extraction script groups are applied. Note that the extraction script stored in advance on the HDD 20 is referred to as a preset extraction script to distinguish it from a newly added extraction script. Further, a newly added extraction script is referred to as a new extraction script. An extraction condition included in the preset extraction script and an extraction condition included in the new extraction script are referred to as a preset extraction condition and a new extraction condition, respectively.

The processor 10 includes a central processing unit (CPU), a random access memory (RAM), and the like and can execute various programs stored on the HDD 20. These programs include an information processing program 11. The information processing program 11 is a program causing the processor 10 to perform processing of applying an extraction script group to text data included in print data.

Predetermined information is extracted by applying the extraction script group to the print information 20a. In other words, it is required that essential information to be extracted from a receipt be determined in advance, and all the essential information can be extracted by applying the extraction script group. A "receipt ID", "product", "total amount", and "print time" in a receipt are predetermined as the essential information. Here, the "receipt ID" is identification information of the receipt. The "product" is a purchased product name. The "total amount" is a total of the prices of the products. The "print time" is a time at which the receipt is printed by the receipt printer 2. Further, a plurality of scripts that can extract the essential information to be extracted from the receipt are set as an extraction script group. That is, the essential information is text data that is set in advance. When the print information 20a is transmitted from a receipt printer 2, the information processing apparatus 1 applies, to text data included in the print information 20a, an extraction script group stored on the HDD 20 in association with a printer ID of the receipt printer 2 that is the transmission source. By doing so, the essential information is extracted.

In some cases, it is desirable to change such an extraction script group. As an example, it may be desirable to add a new extraction script to the extraction script group to extract new information such as a topping for a dish at a restaurant. As another example, it may be desirable to edit or delete one or a plurality of extraction scripts included in the extraction script group in accordance with a specification change of the receipt.

The information processing apparatus 1 according to the present embodiment changes the extraction script group as described above and performs an extraction test by applying the changed extraction script group to print information (test print information) prepared for the test. To perform such processing, the information processing program 11 includes an acquiring section 11a, an extracting section 11b, a copying section 11c, a creating section 11d, an editing section 11e, a deleting section 11f, a selecting section 11g, a test section 11h, and a notifying section 11i. When the information processing program 11 is executed, the processor 10 functions as the acquiring section 11a, the extracting section 11b, the copying section 11c, the creating section 11d, the editing section 11e, the deleting section 11f, the selecting section 11g, the test section 11h, and the notifying section 11i. Among these, the acquiring section 11a and the extracting section 11b are functional sections for extracting predetermined information by applying an extraction script group to print information 20a. The copying section 11c, the creating section 11d, the editing section 11e, the deleting section 11f, the selecting section 11g, the test section 11h, and the notifying section 11i are functional sections for changing an extraction script group and determining whether or not the changed extraction script group properly extracts predetermined information.

The processor 10 performs a function of acquiring, by using the acquiring section 11a, print information 20a from a receipt printer 2. When the print information 20a is transmitted from the receipt printer 2, the processor 10 acquires the print information 20a from the receipt printer 2 via the communication section 30 by using the function of the acquiring section 11a. When the print information 20a is acquired, the processor 10 stores the print information 20a on the HDD 20.

The processor 10 performs a function of extracting, by using the extracting section 11b, predetermined information from the print information 20a by applying an extraction script group to the print information 20a. The processor 10 performs the following processing by using the function of the extracting section 11b. When the print information 20a is acquired from the receipt printer 2 by using the function of the acquiring section 11a, the processor 10 acquires, from the script table 20b, an extraction script group associated with a printer ID of a transmission source of the print information 20a by using the function of the extracting section 11b. Then, the processor 10 applies the acquired extraction script group to the print information 20a. By doing so, the predetermined information including a pair of an item name such as the "receipt ID", "product", "total amount", or "print time" and an item value as essential information is extracted. The extracted information is displayed on the display section of the user I/F section 40.

The extraction script group includes a large number of extraction scripts, for example, 110 extraction scripts. When applying the extraction script group, the processor 10 sequentially applies the extraction scripts from the first extraction script. Further, when a plurality of extraction scripts are applied for the same attribute, the processor 10 overwrites an extraction result obtained using a previously applied extraction script with an extraction result obtained using an extraction script (an extraction script with a higher number) that is added later. Accordingly, it is possible to preferentially apply an extraction result obtained using a newly added extraction script.

The processor 10 performs a function of creating, by using the copying section 11c, a copy of the extraction script group stored in the script table 20b and storing the copy in a read-only memory (ROM). The processor 10 performs the following processing by using the function of the copying section 11c. That is, for example, when an extraction script group stored in the script table 20b is designated as a printer ID through the user I/F section 40 according to a user operation, the processor 10 creates a copy of the designated extraction script group. The copy of the extraction script group is used as a target of a change such as adding, editing, or deleting at the time of performing the change of an extraction script. As such, the extraction script group stored on the HDD 20 is not directly changed. Accordingly, the processor 10 does not apply, by the function of the extracting section 11b, to the print information 20a transmitted from the receipt printer 2, an extraction script group that is being changed or a changed extraction script group.

The processor 10 performs a function of creating, by using the creating section 11d, a new extraction script to be added to an extraction script group that is a change target. For example, the processor 10 creates the 111th extraction script including a new extraction condition as a new extraction script for an extraction script group including 110 extraction scripts by using the function of the creating section 11d. A new extraction script is created, for example, when extracting new information such as a topping for a dish at a restaurant or when an extraction script group to be applied to an unusual receipt such as a receipt during a campaign activity is required.

The processor 10 performs a function of editing, by using the editing section 11e, one or two or more preset extraction scripts included in an extraction script group that is a change target. When a specification of a receipt is changed and thus a print position of a total amount is changed, or when an item name is changed from "TOTAL" in English into a character string in Japanese that means a total amount, among a plurality of preset extraction scripts included in an extraction script group, a preset extraction script that extracts a total amount can be edited to be an extraction script that extracts a total amount from print information after the specification change.

The processor 10 performs a function of deleting, by using the deleting section 11f, one or two or more preset extraction scripts included in an extraction script group that is a change target. When extraction of predetermined text data becomes unnecessary, a preset extraction script corresponding to the unnecessary text data can be deleted to prevent the predetermined text data from being extracted. Further, as described above, when a print position of a total amount is changed, a preset extraction script that extracts a total amount corresponding to a print position before the change can be deleted and an extraction script that extracts a total amount corresponding to a print position after the change can then be created as a new extraction script, instead of performing editing, thereby facilitating the change of the print position of the total amount. An extraction script group includes multiple extraction scripts, and the extraction scripts also include an unnecessary extraction script. Since the processor 10 can delete an extraction script by using the function of the deleting section 11f, it is possible to prevent an unnecessary extraction script from being applied. As a result, it is possible to reduce the operation load.

The processor 10 performs a function of selecting, by using the selecting section 11g, print information 20a as test print information to which a changed extraction script group is to be applied. The processor 10 performs the following processing by using the function of the selecting section 11g. The processor 10 selects test print information among the print information 20a stored on the HDD 20 according to a user operation through the user I/F section 40.

Figure 3:
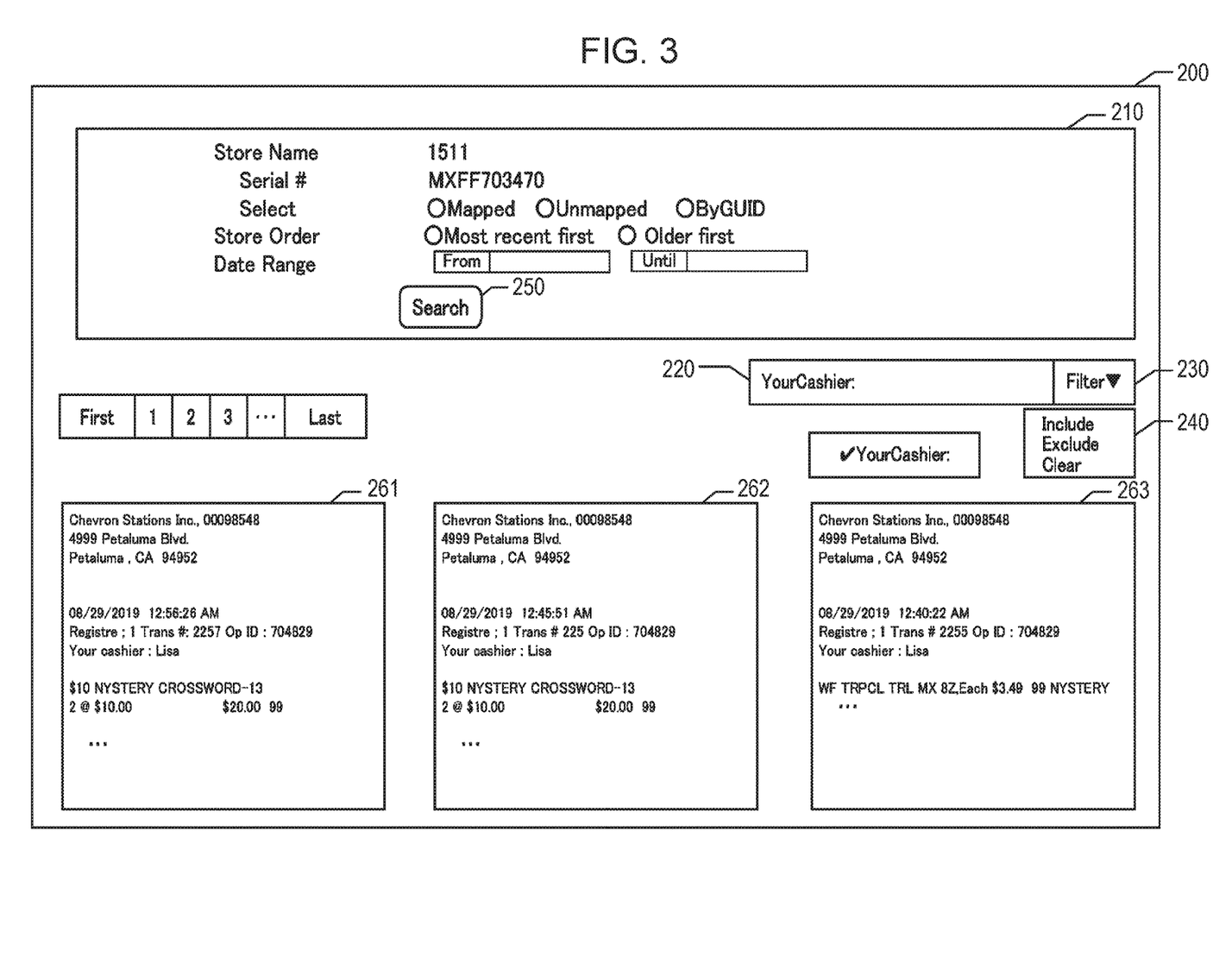
FIG. 3 is a view illustrating an example of a selection screen.

FIG. 3 is a view illustrating an example of a selection screen 200 displayed on the user I/F section 40 when selecting test print information. The user can input a search condition for test print information through a search condition input box 210 and a keyword input box 220 of the selection screen 200. As the search condition, a time and a date range of a receipt can be designated, in addition to a keyword. Further, it is possible to designate whether or not the test print information to be searched for is a structured document. When displaying search results, the search results can be sorted by date, beginning with the most recent search result or the oldest search result.

For example, text data of "YourCashier:" can be designated by a user operation. In addition, when a filter condition button (Filter) 230 is pressed, a selection box 240 for searching for print information 20a including the designated text, and searching for print information 20a that does not include the designated text is displayed. Here, it is possible to select a search condition to be applied. When the searching for text data a including "YourCashier:" is selected, the processor 10 searches the HDD 20 for print information 20a including "YourCashier:" by using the function of the selecting section 11g. By doing so, as illustrated in FIG. 3, pieces of searched print information 261 to 263 including "YourCashier:" are displayed as search results. The processor 10 can perform complex searching for print information 20a including a keyword and print information 20a excluding a keyword. The user can select test print information among the pieces of searched print information 261 to 263 that are displayed.

The processor 10 performs a function of extracting, by using the test section 11h, predetermined text data by applying a changed extraction script group to test print information. The processor 10 performs the following processing by using the function of the test section 11h. That is, when an instruction is provided through the user I/F section 40 to perform a test using an extraction script group, the processor 10 extracts predetermined text data by applying all extraction scripts included in a changed extraction script group to test print information. In more detail, the processor 10 sequentially applies the extraction scripts included in the changed extraction script group. When an extraction script corresponding to the same attribute is applied, the processor 10 overwrites a result obtained by applying an old extraction script with a result obtained by applying a new extraction script.

When an instruction to perform a test using one extraction script included in an extraction script group is provided through the user I/F section 40, the processor 10 applies the one extraction script according to the instruction to test print information. As such, the processor 10 can perform a test for all extraction scripts or one extraction script of an extraction script group according to an instruction from the user. Therefore, with a test in which an extraction script group is applied, the user can check whether or not essential information can be extracted. Accordingly, with a test in which one extraction script is applied, the user can check whether or not text data intended by the applied extraction script can be extracted.

Figure 4:
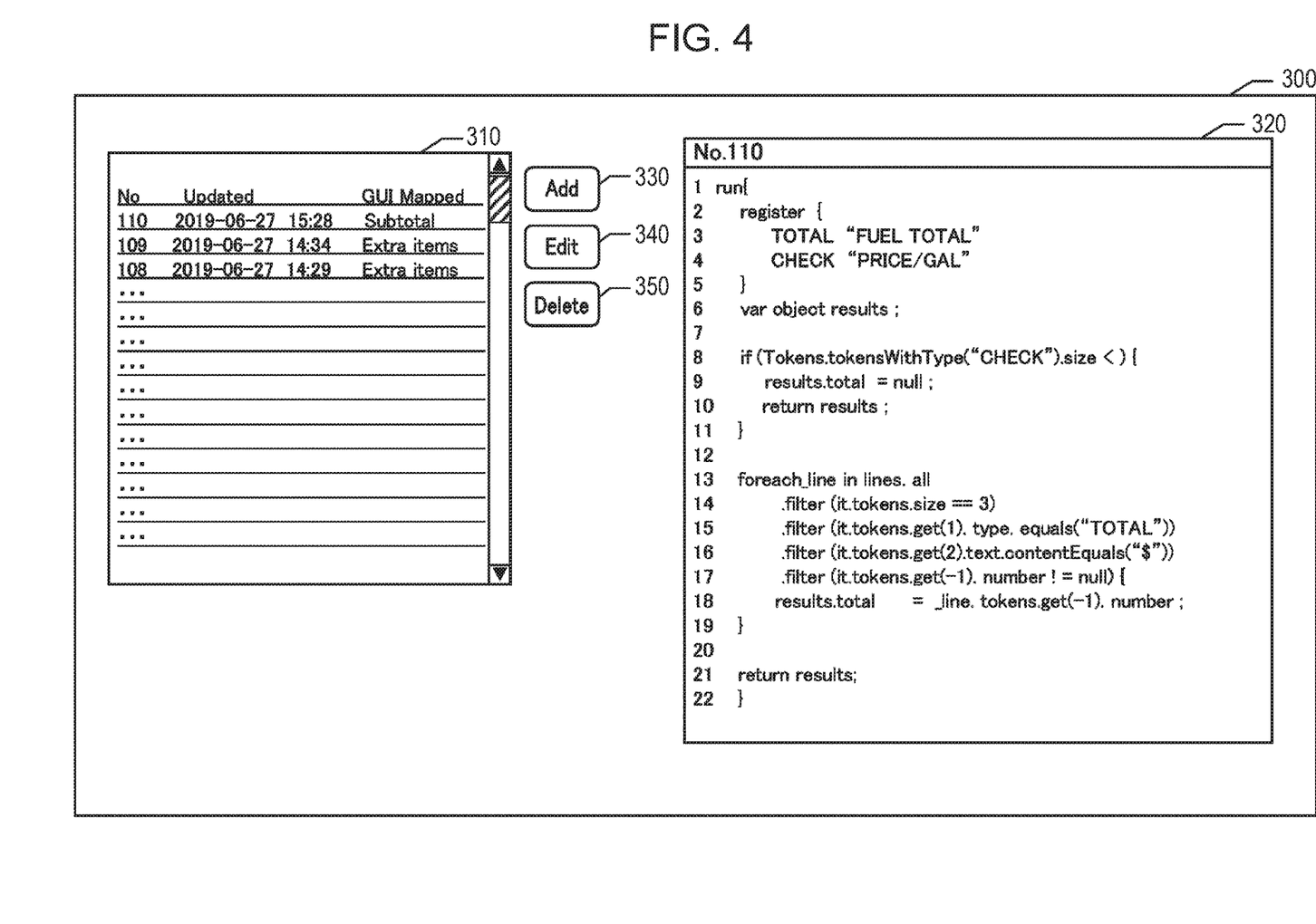
FIG. 4 is a view illustrating an example of an extraction script display screen.
Figure 5:
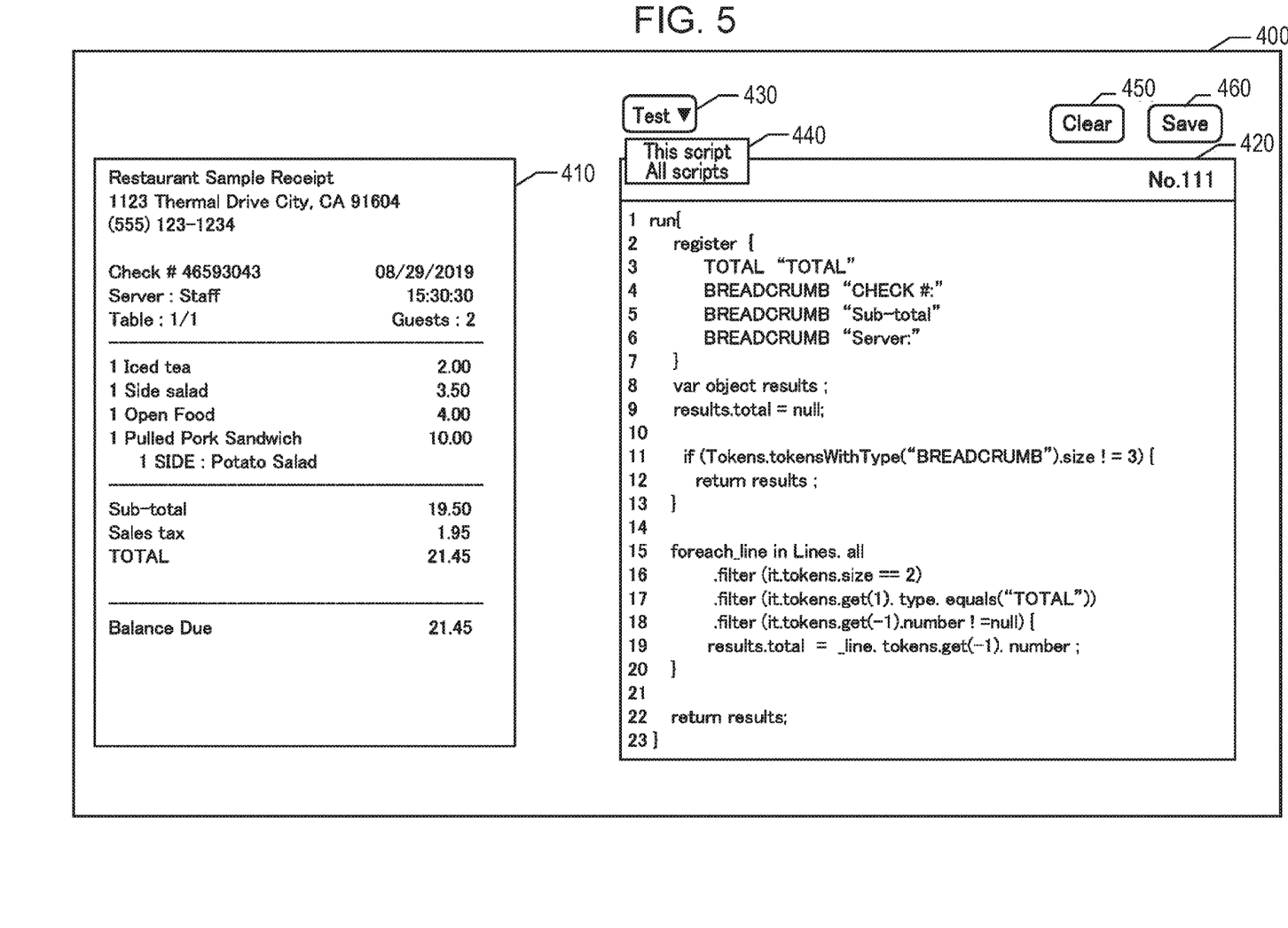
FIG. 5 is a view illustrating an example of an addition screen.
Figure 6:
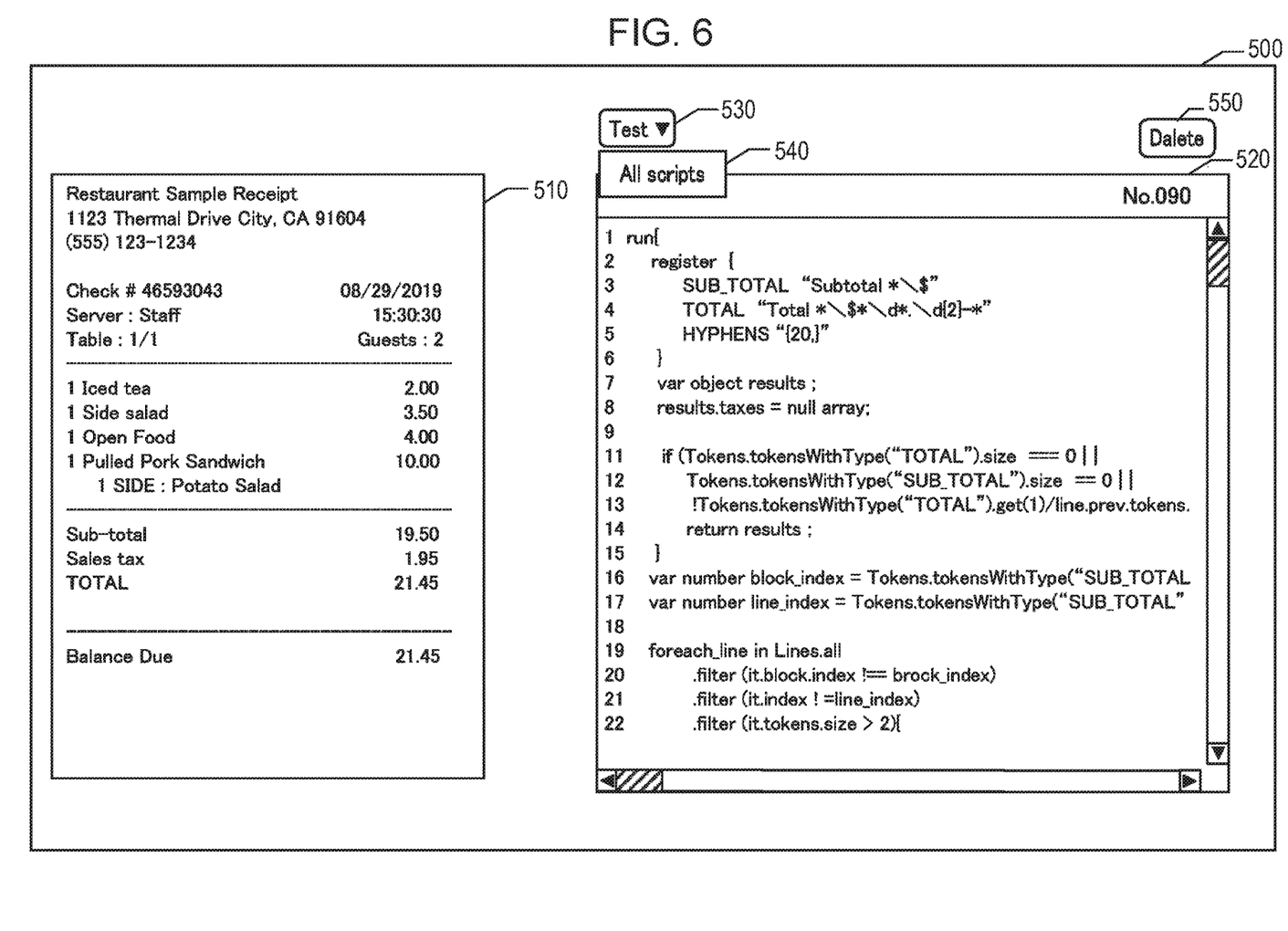
FIG. 6 is a view illustrating an example of a deletion screen.

FIGS. 4 to 6 are views each illustrating an example of a screen displayed on the user I/F section 40 when editing, adding, or deleting an extraction script. FIG. 4 is a diagram illustrating an extraction script display screen 300. The extraction script display screen 300 includes a list display region 310 and an extraction script display region 320. In the list display region 310, a list of extraction scripts included in an extraction script group is displayed. When one extraction script is selected in the list display region 310 according to a user operation, the selected extraction script is displayed in the extraction script display region 320.

On the extraction script display screen 300, an addition button (Add) 330, an editing button (Edit) 340, and a deletion button (Delete) 350 are displayed. When the addition button 330 is selected by the user, an addition screen 400 is displayed. When the editing button 340 is selected, an editing screen is displayed, and when the deletion button 350 is selected, a deletion screen 500 is displayed.

FIG. 5 is a view illustrating an example of the addition screen 400. The addition screen 400 includes a receipt display region 410 and an extraction script display region 420. In the receipt display region 410, a receipt to which an extraction script to be added is to be applied is displayed. A new extraction script to be added is displayed in the extraction script display region 420. When a new extraction script is created by the user inputting text in the extraction script display region 420, the processor 10 creates a new extraction script according to content input in the extraction script display region 420 by using the function of the creating section 11d.

When a test button (Test) 430 is pressed, a selection box 440 for selecting whether to perform a test in which one extraction script is applied or perform a test in which all extraction scripts are applied is displayed. Here, when any one of the tests is selected, the test in which one extraction script is applied or the test in which the extraction script group is applied is performed by the function of the test section 11h of the processor 10. When a save button (Save) 460 is selected, the created extraction script is added to the script table 20b. Note that when a cancel button (Clear) 450 is selected, the newly created extraction script is cleared. The editing screen (not illustrated) is substantially the same as the addition screen 400, and a receipt to which an extraction script to be edited is to be applied is displayed in the receipt display region 410, and an extraction script that is an editing target is displayed in the extraction script display region 420.

FIG. 6 is a view illustrating an example of the deletion screen 500. The deletion screen 500 includes a receipt display region 510 and an extraction script display region 520. In the receipt display region 510, a receipt to which an extraction script to be deleted is to be applied is displayed. In the extraction script display region 520, an extraction script to be deleted is displayed when the extraction script that is a deletion target is selected according to a user operation. In addition, when a test button (Test) 530 is pressed, an icon 540 for performing a test in which all extraction scripts are applied is displayed, and the test is performed. When a deletion button (Delete) 550 is selected, the displayed extraction script is deleted from the script table 20b.

The processor 10 performs a function of making, by the notifying section 11i, completion notification when essential information was able to be extracted as predetermined text data by applying an extraction script group. The processor 10 performs the following processing by using the function of the notifying section 11i. The processor 10 checks whether or not four pieces of information as the essential information, that is, pairs of an item name such as the "receipt ID", "product", "total amount", or "print time" and an item value were able to be extracted as the predetermined text data. Further, when the four pieces of essential information were able to be extracted, the processor 10 notifies the user of completion by displaying information for making completion notification on the display section of the user I/F section 40. As such, the processor 10 automatically checks whether or not the essential information was able to be extracted, and makes completion notification when it is checked that the essential information was able to be extracted. The user can check, based on whether or not the completion notification is made, whether or not a result intended by the user was able to be obtained by using a changed extraction script group, that is, whether or not intended text data was able to be extracted. That is, it is possible to efficiently check whether or not the essential information was able to be extracted.

Note that when the essential information was able to be extracted by using a changed extraction script group, and a change reflection instruction is received according to a user operation, the processor 10 replaces an extraction script group that is an original copy and is stored in the script table 20b with the changed extraction script group.

As described above, the processor 10 of the information processing apparatus 1 according to the present embodiment generates a new extraction script including a new extraction condition for an extraction script group set in the HDD 20. Then, the processor 10 extracts text data by applying the extraction script group including the new extraction script to test print information. When the extraction script group to which the new extraction script is added is applied, there is a possibility that essential information cannot be extracted from print information. Therefore, the processor 10 can automatically perform a test to check whether or not the essential information can be extracted by applying the extraction script group including the new extraction script to the test print information after the new extraction script is generated. That is, it is possible to examine whether or not the extraction condition group including the new extraction condition is proper. In addition, when the essential information that is set in advance was able to be extracted in the test, it is possible to make completion notification. The user can check whether or not the essential information was able to be extracted based on whether or not completion notification is made. Similarly, even when at least one preset extraction script included in an extraction script group is added or deleted, the processor 10 can automatically perform a test to check whether or not the essential information can be extracted by applying the extraction script group after the addition or deletion to the test print information.

The processor 10 uses the print information 20a corresponding to an actual printed receipt as the test print information. By doing so, it is possible to perform a test considering a real situation in which the extraction script group is applied. Further, the processor 10 can properly select print information 20a to which the changed extraction script group is to be applied by using a keyword according to a user operation. As a result, it is possible to obtain a proper test result.

2) Information Processing

Figure 7:
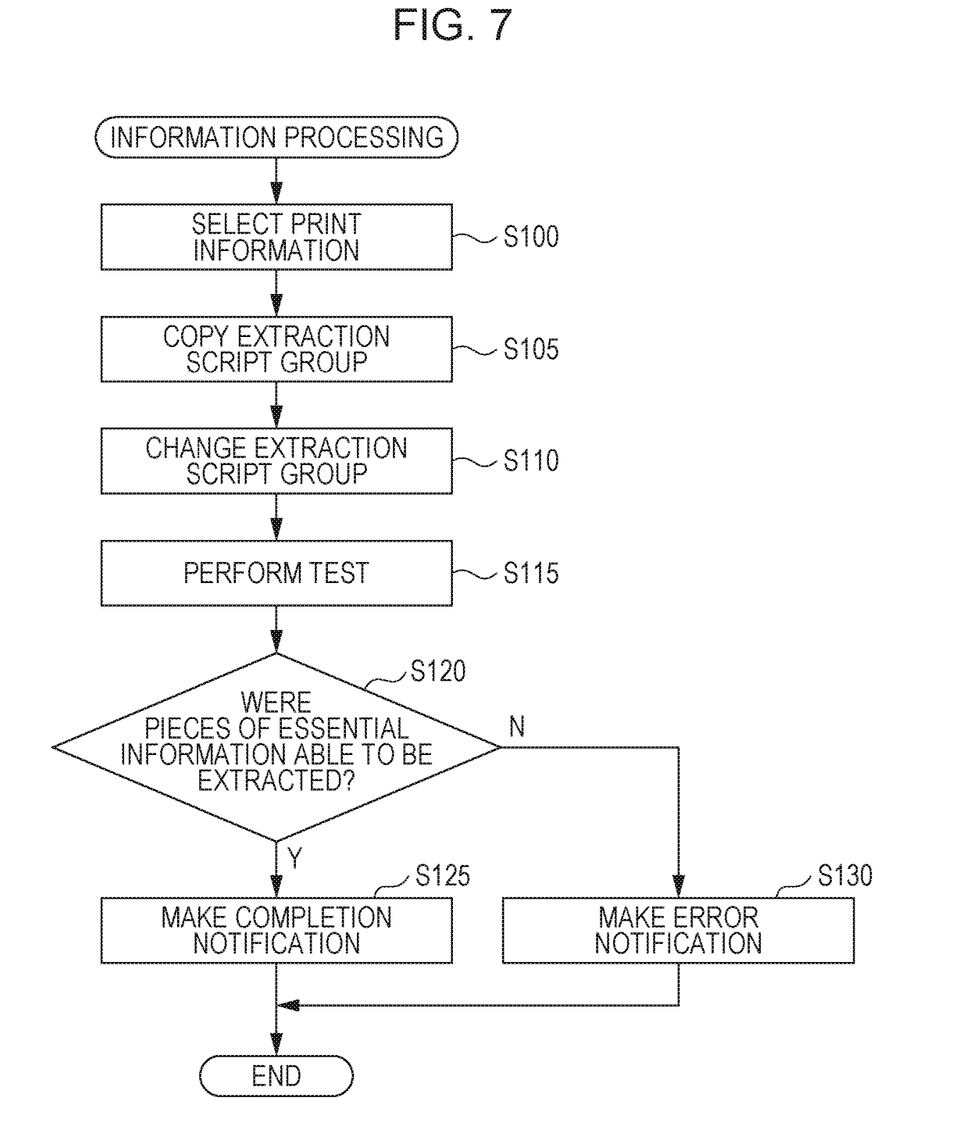
FIG. 7 is a flowchart illustrating information processing.

Information processing performed by the processor 10 will be described. FIG. 7 is a flowchart illustrating the information processing. First, the processor 10 selects, by using the function of the selecting section 11g, print information 20a to be used as test print information among print information 20a stored on the HDD 20 by using a keyword according to a user operation performed through the user I/F section 40 (Step S100). Then, when an extraction script group or printer ID is designated according to a user operation performed through the user I/F section 40, the processor 10 specifies the extraction script group according to the designation, copies the specified extraction script group, and records the copy of the specified extraction script group in the ROM by using the function of the copying section 11c (Step S105).

Next, the processor 10 changes the extraction script group by using the function of the creating section 11d, the editing section 11e, or the deleting section 11f (Step S110). Specifically, when an instruction for creation is provided by a user operation, the processor 10 creates a new extraction script by using the function of the creating section 11d. The processor 10 opens a text editor according to a user operation, and receives an input of text data indicating a command statement configuring a script. When a saving instruction is received according to a user operation, the processor 10 saves an input content as a new extraction script. Further, when an instruction for editing is provided by a user operation, the processor 10 edits one or two or more preset extraction scripts according to the instruction by using the function of the editing section 11e. The processor 10 opens an editor for a preset extraction script designated as an editing target according to a user operation, and receives an input of an instruction such as rewriting of a command statement. When a reflection instruction is received according to a user operation, the processor 10 saves a preset extraction script that reflects an editing content.

When an instruction for deleting is provided by a user operation, the processor 10 deletes one or two or more preset extraction scripts according to the instruction by using the function of the deleting section 11f. In the editing and deletion, a preset extraction script that is a target of the editing and deletion is designated according to a user operation.

Next, the processor 10 performs a test in which text data is extracted by applying a changed extraction script group to test print information (Step S115). Next, the processor 10 checks whether or not all of four pieces of essential information were able to be extracted in the test by using the function of the notifying section 11i (Step S120). When all of the four pieces of essential information were able to be extracted (Y in Step S120), the processor 10 makes completion notification by using the function of the notifying section 11i (Step S125). On the other hand, when at least one of the four pieces of essential information was not able to be extracted (N in Step S120), the processor 10 makes error notification by using the function of the notifying section 11i (Step S130). Then, the information processing is completed.

3) Other Embodiments

The above-described embodiment is merely an example, other various embodiments can be adopted. For example, an information processing apparatus 1 according to another embodiment may be provided in various forms, and may be provided by a plurality of apparatuses such as a cloud type server. In addition, a method of identifying the type of the printed material printed with print information 20a based on text data included in the print information 20a as in the above-described embodiment can be implemented as a program invention or a method invention.

Although an example in which an extraction script including an extraction condition implements extraction processing has been described in the present embodiment, extraction processing may also be implemented by a program that can implement extraction processing according to an extraction condition, as long as extraction processing can be implemented.

The extraction condition is not limited to that in the embodiment, as long as text data is extracted based on at least one of a position and an attribute of text data that is an extraction target. For example, a print position of a receipt may be divided into a plurality of blocks in a vertical direction, and the extraction target may be specified by specifying a position of a block.

In the present embodiment, print information 20a transmitted from a receipt printer 2, that is, print information 20a corresponding to an actual printed receipt is used as the test print information. However, it is sufficient that the test print information is information suitable for an extraction script group that is a test target, and is not limited to the print information 20a transmitted from the receipt printer 2. As another example, a manager or the like may create a sample of the test print information and use the sample as the test print information. By doing so, it is possible to perform the test even when print information 20a corresponding to a printed receipt is not accumulated on the HDD 20.

In the present embodiment, text data to be extracted by the processor 10 in the test are four pieces of essential information. However, the number of text data to be extracted, and a content thereof are not limited to those in the embodiment. As another example, the essential information may be less than four, or five or more pieces of text data.

An output destination of the completion notification and error notification is not limited to the user I/F section 40. As another example, the processor 10 may transmit the completion notification and error notification to another apparatus such as the receipt printer 2 or a portable terminal apparatus (not illustrated) used by a manager, via the communication section 30.

The present disclosure can also be applied as a program or a method executed by a computer. The above-described system, program, and method may be implemented as a single apparatus or may be implemented by using components included in a plurality of apparatuses, and thus the system, program, and method include various aspects. The present disclosure can be appropriately modified. For example, the present disclosure is partially implemented by software and partially implemented by hardware. The present disclosure can also be applied as a recording medium of a program that controls a system. The recording medium of a program may be a magnetic recording medium, a semiconductor memory, or any recording medium to be developed in the future.

What is claimed is:

1. An information processing method of an information processing apparatus configured to receive a plurality of print information for printing receipts and to extract, from text data included in the print information, a pair of an item name and an item value corresponding to the item name, the information processing method comprising:
   storing a first extraction script group including a plurality of extraction scripts, the extraction script including an extraction condition under which the pair is extracted;
   generating, based on at least one of a position and an attribute of the text data included in the print information, a new extraction condition under which the pair is extracted;
   generating a second extraction script group by using the first extraction script group and the new extraction condition; and performing a test in which the second extraction script group is applied to test print information to extract the pair.

2. The information processing method according to claim 1, wherein the information processing apparatus:

receives the plurality of print information by performing communication with a receipt printer, stores the plurality of print information, searches for the print information to be applied to the second extraction script group among the plurality of print information that is stored, causes selection, by a user operation, of the print information as the test print information among the print information that is searched, and uses, as the test print information, the print information that is selected.

3. The information processing method according to claim 1, wherein the information processing apparatus:

displays one extraction script of the plurality of extraction scripts included in the first extraction script group, and when the one extraction script that is displayed is edited by a user operation, generates the second extraction script group including the one extraction script that is edited.

4. The information processing method according to claim 1, wherein the information processing apparatus:

displays one extraction script of the plurality of extraction scripts included in the first extraction script group, and when an instruction to delete the one extraction script that is displayed is provided by a user operation, generates the second extraction script group from which the one extraction script is deleted.

5. The information processing method according to claim 1, wherein when the test is performed, in a case in which the pair that is set in advance is extracted, the information processing apparatus generates a completion notification.

6. An information processing apparatus that extracts a pair of an item name and an item value corresponding to the item name, the information processing apparatus comprising:

a communication section configured to receive a plurality of print information for printing receipts;

a storage section configured to store a first extraction script group including a plurality of extraction scripts, the extraction script including an extraction condition under which the pair is extracted from text data included in the print information, and the plurality of print information; and a processor configured to generate, based on at least one of a position and an attribute of the text data included in the print information, a new extraction condition under which the pair is extracted, generate a second extraction script group by using the first extraction script group and the new extraction condition, and perform a test, in which the second extraction script group that is generated is applied to test print information to extract the pair.

7. The information processing apparatus according to claim 6, wherein the communication section configured to receive the plurality of print information by performing communication with a receipt printer, and the processor:

searches for the print information to be applied to the second extraction script group among the plurality of print information that is stored, causes selection, by a user operation, of the print information as the test print information among the print information that is searched, and uses, as the test print information, the print information that is selected.

8. The information processing apparatus according to claim 6, further comprising a display section, wherein the display section displays one extraction script of the plurality of extraction scripts included in the first extraction script group.

9. The information processing apparatus according to claim 8, wherein when the one extraction script displayed on the display section is edited by a user operation, the processor generates the second extraction script group including the one extraction script that is edited.

10. The information processing apparatus according to claim 8, wherein when an instruction is provided by a user operation to delete the one extraction script displayed on the display section, the processor generates the second extraction script group from which the one extraction script is deleted.

11. The information processing apparatus according to claim 6, wherein when the test is performed, in a case in which the pair that is set in advance is extracted, the processor generates a completion notification.

12. A non-transitory computer-readable storage medium storing a program, the program causing a computer of an information processing apparatus that receive a plurality of print information for printing receipts, and that extracts, from text data included in the print information, a pair of an item name and an item value corresponding to the item name to perform:

storing a first extraction script group including a plurality of extraction scripts, the extraction script including an extraction condition under which the pair is extracted;

generating, based on at least one of a position and an attribute of the text data included in the print information, a new extraction condition under which the pair is extracted;

generating a second extraction script group by using the first extraction script group and the new extraction condition; and performing a test in which the second extraction script group is applied to test print information to extract the pair.

13. The non-transitory computer-readable storage medium storing the program according to claim 12, wherein the program causes the information processing apparatus to:

receive the plurality of print information, by performing communication with a receipt printer, store the plurality of print information, search for the print information to be applied to the second extraction script group among the plurality of print information that is stored, select, by a user operation, the print information as the test print information among plurality of the print information that is searched, and use, as the test print information, the print information that is selected.

14. The non-transitory computer-readable storage medium storing the program according to claim 12, wherein the program causes the information processing apparatus to:
display one extraction script of the plurality of extraction scripts included in the first extraction script group, and
when the one extraction script that is displayed is edited by a user operation, generate the second extraction script group including the one extraction script that is edited.

15. The non-transitory computer-readable storage medium storing the program according to claim 12, wherein the program causes the information processing apparatus to:
display one extraction script of the plurality of extraction scripts included in the first extraction script group, and
when an instruction to delete the one extraction script that is displayed is provided by a user operation, generate the second extraction script group from which the one extraction script is deleted.

16. The non-transitory computer-readable storage medium storing the program according to claim 12, wherein the program causes the information processing apparatus to:
when the test is performed, in a case in which the pair that is set in advance is extracted, generate a completion notification.

* * * * *